US011700048B1

(12) United States Patent
Zheng et al.

(10) Patent No.: US 11,700,048 B1
(45) Date of Patent: Jul. 11, 2023

(54) BEAMFORMING METHOD AND DEVICE BASED ON PHASE SHIFTER SWITCHING CONTROL, AND SYSTEM

(71) Applicant: Harbin Institute of Technology, Shenzhen, Shenzhen (CN)

(72) Inventors: Fu-Chun Zheng, Shenzhen (CN); Ke Xu, Shenzhen (CN)

(73) Assignee: HARBIN INSTITUTE OF TECHNOLOGY, SHENZHEN, Shenzhen (CN)

( * ) Notice: Subject to any disclaimer, the term of this patent is extended or adjusted under 35 U.S.C. 154(b) by 0 days.

(21) Appl. No.: 17/890,418

(22) Filed: Aug. 18, 2022

(30) Foreign Application Priority Data

Apr. 14, 2022 (CN) .......................... 202210413858.5

(51) Int. Cl.
*H04B 7/08* (2006.01)
*H04B 7/06* (2006.01)
*H04B 17/309* (2015.01)
*H04B 7/0426* (2017.01)

(52) U.S. Cl.
CPC ............. *H04B 7/086* (2013.01); *H04B 7/043* (2013.01); *H04B 7/0636* (2013.01); *H04B 17/309* (2015.01)

(58) Field of Classification Search
CPC ...... H04B 7/086; H04B 7/043; H04B 7/0636; H04B 17/309; H01Q 3/26; H01Q 3/2605; H01Q 3/2611; H01Q 3/2617; H01Q 3/30; H01Q 3/34; H01Q 3/36; H01Q 3/38; H01Q 3/40
See application file for complete search history.

(56) References Cited

U.S. PATENT DOCUMENTS

| | | | | |
|---|---|---|---|---|
| 3,806,930 A * | 4/1974 | Gobert | ....................... | G01S 3/42 342/368 |
| 4,228,436 A * | 10/1980 | DuFort | .................... | H01Q 3/40 342/373 |
| 4,318,104 A * | 3/1982 | Enein | ....................... | H01Q 3/40 342/372 |
| 4,849,763 A * | 7/1989 | DuFort | .................... | H01Q 3/36 342/372 |
| 5,206,655 A * | 4/1993 | Caille | ....................... | H01Q 3/26 342/25 R |
| 9,973,943 B2 * | 5/2018 | Lysejko | .................... | H01Q 3/02 |

(Continued)

*Primary Examiner* — James M Perez
(74) *Attorney, Agent, or Firm* — Whiteford, Taylor & Preston, LLP; Peter J. Davis (57) ABSTRACT

Embodiments of the present disclosure provide a beamforming method and device based on phase shifter switching control, and a system. The method includes: acquiring a channel vector of a channel of each of low-load terminals; acquiring, based on the channel vector, contribution degrees of phase shifters corresponding to the channel; sequentially changing a connected state of each of the phase shifters from closing to opening based on the contribution degrees of the phase shifters corresponding to the channel, calculating a to-be-processed signal-to-interference-plus-noise ratio (SINR) of the low-load terminal after changing the connected state of the phase shifter once, stopping to change the connected state of the phase shifter if the to-be-processed SINR meets a preset condition, and changing the connected state of the phase shifter meeting the preset condition to the closing.

9 Claims, 5 Drawing Sheets

(56) References Cited

U.S. PATENT DOCUMENTS

| | | | | |
|---|---|---|---|---|
| 10,070,325 B2* | 9/2018 | Logothetis | | H04W 16/28 |
| 10,277,370 B2* | 4/2019 | Moshfeghi | | H04B 1/401 |
| 10,340,594 B1* | 7/2019 | Wurtenberger | | H01Q 3/34 |
| 10,476,149 B1* | 11/2019 | Ueda | | H01Q 21/08 |
| 11,258,576 B2* | 2/2022 | Zhang | | H04L 1/0033 |
| 11,411,624 B2* | 8/2022 | Rafique | | H04B 7/0469 |
| 11,469,499 B2* | 10/2022 | Kim | | H04B 1/18 |
| 2003/0179139 A1* | 9/2003 | Nemit | | H01Q 3/26 |
| | | | | 342/383 |
| 2004/0095907 A1* | 5/2004 | Agee | | H04B 7/10 |
| | | | | 370/400 |
| 2005/0285785 A1* | 12/2005 | Martin | | H01Q 3/2611 |
| | | | | 342/372 |
| 2012/0257653 A1* | 10/2012 | Nagaishi | | H01Q 3/2682 |
| | | | | 342/374 |
| 2013/0027240 A1* | 1/2013 | Chowdhury | | G01S 13/345 |
| | | | | 342/175 |
| 2013/0195222 A1* | 8/2013 | Zatman | | H04L 27/361 |
| | | | | 375/300 |
| 2014/0022116 A1* | 1/2014 | Lee | | H01Q 3/30 |
| | | | | 342/372 |
| 2014/0376657 A1* | 12/2014 | Agee | | H04W 24/02 |
| | | | | 375/267 |
| 2016/0226570 A1* | 8/2016 | Nicholls | | H04B 7/0897 |
| 2016/0285481 A1* | 9/2016 | Cohen | | H03F 1/02 |
| 2016/0353294 A1* | 12/2016 | Wang | | H04W 24/02 |
| 2016/0380363 A1* | 12/2016 | Logothetis | | H04W 72/23 |
| | | | | 343/853 |
| 2016/0381590 A1* | 12/2016 | Lysejko | | H04B 7/02 |
| | | | | 370/252 |
| 2016/0381591 A1* | 12/2016 | Lysejko | | H01Q 21/00 |
| | | | | 370/252 |
| 2017/0077600 A1* | 3/2017 | Maltsev | | H01Q 19/065 |
| 2018/0026379 A1* | 1/2018 | Barker | | H01Q 21/24 |
| | | | | 343/844 |
| 2018/0198204 A1* | 7/2018 | Kovacic | | H04W 52/367 |
| 2018/0269576 A1* | 9/2018 | Scarborough | | H01Q 1/288 |
| 2018/0277963 A1* | 9/2018 | Desclos | | H01Q 21/0075 |
| 2018/0309515 A1* | 10/2018 | Murakowski | | H04B 10/2575 |
| 2019/0058530 A1* | 2/2019 | Rainish | | H04B 7/0617 |
| 2019/0089434 A1* | 3/2019 | Rainish | | H04B 7/0617 |
| 2019/0172635 A1* | 6/2019 | Ku | | H01F 30/12 |
| 2019/0238375 A1* | 8/2019 | Bowen | | H01Q 3/44 |
| 2019/0305849 A1* | 10/2019 | Murakowski | | H04B 10/69 |
| 2019/0379446 A1* | 12/2019 | Rothaar | | H04B 7/18541 |
| 2019/0393921 A1* | 12/2019 | Sengupta | | H04B 7/0413 |
| 2020/0091608 A1* | 3/2020 | Alpman | | H04B 7/0639 |
| 2020/0136240 A1* | 4/2020 | Pelletti | | G05D 1/028 |
| 2021/0028832 A1* | 1/2021 | Liu | | H04W 16/28 |
| 2021/0050668 A1* | 2/2021 | Ota | | H01Q 1/246 |
| 2021/0175635 A1* | 6/2021 | Brobston | | H01Q 1/523 |
| 2021/0194124 A1* | 6/2021 | Kim | | H04B 7/0695 |
| 2021/0399774 A1* | 12/2021 | Rafique | | H04B 7/0617 |
| 2023/0100894 A1* | 3/2023 | Malekzadeh | | H01P 1/184 |
| | | | | 342/385 |

* cited by examiner

BEAMFORMING METHOD AND DEVICE BASED ON PHASE SHIFTER SWITCHING CONTROL, AND SYSTEM

CROSS REFERENCE TO RELATED APPLICATION

This patent application claims the benefit and priority of Chinese Patent Application No. 202210413858.5, filed on Apr. 14, 2022, the disclosure of which is incorporated by reference herein in its entirety as part of the present application.

TECHNICAL FIELD

The present disclosure relates to the technical field of communications, and in particular to a beamforming method and device based on phase shifter switching control, and a system.

BACKGROUND ART

There are various types of users in modern millimeter-wave communication systems. Typically, loads on an uplink channel and a downlink channel are different. For example, unmanned aerial vehicles (UAVs) or high-definition monitoring photographing devices have a greater demand for the uplink channel than the downlink channel. Smartphones or tablet computers for browsing high-definition videos or downloading large files have a huge demand for the downlink channel. Hence, it is necessary to adjust an uplink load and a downlink load properly according to different balancing strategies to achieve maximum utilization of system resources.

At present, existing uplink-downlink channel balancing strategies throughout the industry are mainly accomplished by adjusting time slots for uplink and downlink transmission in a time division duplex (TDD) mode, which is called dynamic TDD. Specifically, more transmission time is allocated to a high-load side than a low-load side. However, the method is only available to scenarios with balanced loads on uplink and downlink channels of the millimeter-wave communication systems. All users receive a same load balance result, namely, adjusted uplink channel capacities and downlink channel capacities of all users are the same completely. Scenarios with unbalanced loads on uplink and downlink channels of the users cannot be addressed.

Therefore, a data stream transmission method is needed urgently to solve the above technical problem.

SUMMARY

Embodiments of the present disclosure provide a beamforming method and device based on phase shifter switching control, and a system, to adjust a width of a beam, thereby reducing the power consumption, and improving the energy efficiency of the system.

According to a first aspect, an embodiment of the present disclosure provides a beamforming method based on phase shifter switching control, including: acquiring a channel vector of a channel of each of low-load terminals, the channel being a channel at a low-load side of the low-load terminal; acquiring, based on the channel vector, contribution degrees of phase shifters corresponding to the channel, where there are a plurality of the phase shifters corresponding to the channel, and the phase shifters are located in a base station (BS); sequentially changing a connected state of each of the phase shifters from closing to opening based on the contribution degrees of the phase shifters corresponding to the channel, calculating a to-be-processed signal-to-interference-plus-noise ratio (SINR) of the low-load terminal after changing the connected state of the phase shifter once, stopping to change the connected state of the phase shifter if the to-be-processed SINR meets a preset condition, and changing the connected state of the phase shifter meeting the preset condition to the closing; and adjusting, with at least one phase shifter having the connected state in the closing, a width of a beam corresponding to the low-load terminal, the beam being formed by an electromagnetic wave transmitted from the BS to the low-load terminal or an electromagnetic wave received from the low-load terminal.

Preferably, before the acquiring a channel vector of a channel of each of the low-load terminals, the beamforming method may further include: determining, when detecting that to-be-transmitted data streams on an uplink channel and a downlink channel of a terminal are different in size, that the terminal is the low-load terminal, where the to-be-transmitted data streams each may be transmitted in a form of the electromagnetic wave, and the electromagnetic wave may form the beam.

Preferably, after the acquiring a channel vector of a channel of each of low-load terminals, the beamforming method may further include: acquiring an initial SINR of the low-load terminal based on the channel vector; and the stopping to change the connected state of the phase shifter if the to-be-processed SINR meets a preset condition may include: stopping to change the connected state of the phase shifter if the to-be-processed SINR is less than preset times of the initial SINR.

Preferably, there may be a plurality of the low-load terminals; and the acquiring an initial SINR of the low-load terminal based on the channel vector may include: inputting the channel vector of the low-load terminal to an initial SINR function to acquire the initial SINR of the low-load terminal, $$\mathrm{SINR}_k = \frac{P_t/K |h_k^H F_{RF}[F_{BB}]_{:,k}|^2}{\sigma^2 + P_t/K \left| h_k^H \sum_{u \ne k}^{K} F_{RF}[F_{BB}]_{:,u} \right|^2}$$

where, $\mathrm{SINR}_k$ may represent an initial SINR of a kth low-load terminal, k may represent a serial number of the low-load terminal, $h_k$ may represent a channel vector of the kth low-load terminal, $P_t$ may be a transmitted power of the BS in a system, $F_{RF}$ may be a matrix of an analog beamformer, $F_{BB}$ may be a matrix of a digital beamformer, $[F_{BB}]_{:,k}$ may represent a kth column of elements of the digital beamformer, $[F_{BB}]_{:,u}$ may represent a uth column of elements of the digital beamformer, $\sigma^2$ may represent a noise power, K may represent a number of the low-load terminals, each of the phase shifters may be connected to one switch, and the analog beamformer may include at least one phase shifter and a switch connected to the at least one phase shifter.

Preferably, the acquiring, based on the channel vector, contribution degrees of phase shifters corresponding to the channel may include: inputting the channel vector of the low-load terminal to a contribution degree function to acquire a contribution degree of each of the phase shifters corresponding to the channel:

$$\delta(a_k) = \sum_{k=1}^{K} \frac{\gamma_k |[h_k]_{a_k}|^2}{\Sigma_{u=1}^{K}([h_u]_{a_k})^H [h_k]_{a_k}}$$

where, $\delta(a_k)$ may represent a contribution degree of an $a_k$ th phase shifter corresponding to a channel of the kth low-load terminal, $h_u$ may represent a channel vector of a uth low-load terminal, $h_u$ falling within a range of [1, K], $h_k$ may represent the channel vector of the kth low-load terminal, $[h_k]_{a_k}$ may represent a channel element, corresponding to an $a_k$th BS antenna, in the channel vector of the kth low-load terminal, $[h_u]_{a_k}$ may represent a channel element, corresponding to the $a_k$th BS antenna, in the channel vector of the uth low-load terminal, $\gamma_k$ may represent the preset times, the BS may include a plurality of BS antennas, and each of the phase shifters may be connected to one of the BS antennas.

Preferably, the calculating a to-be-processed SINR of the low-load terminal may include: calculating, for the low-load terminal, the channel vector of the low-load terminal, the connected state of the phase shifter, and a number of the BS antennas through a to-be-processed SINR function to acquire the to-be-processed SINR of the low-load terminal:

$$\tau_k(S_k) = \frac{P_t/K |h_{k,s}^H h_{k,s}|^2}{\sigma_n^2 + P_t/K \left| h_{k,s}^H \sum_{u \neq k}^{K} h_{u,s} \right|^2}$$

where, $\tau_k(S_k)$ may represent a to-be-processed SINR of the kth low-load terminal, $h_{k,s} = h_k S_k$ may represent an updated channel vector after a kth phase shifter may be switched off, $S_k$ may represent a selection matrix of the kth low-load terminal, a number of rows and a number of columns in the selection matrix depending on the number of the BS antennas, the selection matrix being a diagonal matrix and an element on a diagonal line being 0 or 1, 0 indicating that the connected state of the phase shifter is the opening, and 1 indicating that the connected state of the phase shifter is the closing, and $\sigma_n^2$ may represent equivalent noise.

Preferably, the sequentially changing a connected state of each of the phase shifters from closing to opening based on the contribution degrees of the phase shifters corresponding to the channel may include: sorting, for the phase shifters corresponding to the channel, the contribution degrees of the phase shifters in an ascending manner, and sequentially changing the connected state of each of the phase shifters from the closing to the opening.

According to a second aspect, an embodiment of the present disclosure further provides a beamforming device based on phase shifter switching control, including: a channel vector acquisition module configured to acquire a channel vector of a channel of each of low-load terminals, the channel being a channel at a low-load side of the low-load terminal; a contribution degree acquisition module configured to acquire, based on the channel vector, contribution degrees of phase shifters corresponding to the channel, where there are a plurality of the phase shifters corresponding to the channel, and the phase shifters are located in a BS; a phase shifter switching-off module configured to sequentially change a connected state of each of the phase shifters from closing to opening based on the contribution degrees of the phase shifters corresponding to the channel, calculate a to-be-processed SINR of the low-load terminal after changing the connected state of the phase shifter once, stop to change the connected state of the phase shifter if the to-be-processed SINR meets a preset condition, and change the connected state of the phase shifter meeting the preset condition to the closing; and a width adjustment module configured to adjust, with at least one phase shifter having the connected state in the closing, a width of a beam corresponding to the low-load terminal, the beam being formed by an electromagnetic wave transmitted from the BS to the low-load terminal or an electromagnetic wave received from the low-load terminal.

According to a third aspect, an embodiment of the present disclosure further provides a wireless communication system, including low-load terminals, a plurality of phase shifter, a BS, and a beamforming device based on phase shifter switching control, where the low-load terminals each are configured to transmit an electromagnetic wave to the BS, or receive an electromagnetic wave from the BS; the plurality of phase shifters are located in the BS, and configured to adjust a width of a beam, the beam being formed by the electromagnetic wave transmitted from the low-load terminal to the BS or the electromagnetic wave received from the BS; and the beamforming device based on phase shifter switching control includes a channel vector acquisition module, a contribution degree acquisition module, a phase shifter switching-off module, and a width adjustment module, where the channel vector acquisition module is configured to acquire a channel vector of a channel of the low-load terminal, the channel being a channel at a low-load side of the low-load terminal; the contribution degree acquisition module is configured to acquire, based on the channel vector, contribution degrees of phase shifters corresponding to the channel, where there are a plurality of the phase shifters corresponding to the channel; the phase shifter switching-off module is configured to sequentially change a connected state of each of the phase shifters from closing to opening based on the contribution degrees of the phase shifters corresponding to the channel, calculate a to-be-processed SINR of the low-load terminal after changing the connected state of the phase shifter once, stop to change the connected state of the phase shifter if the to-be-processed SINR meets a preset condition, and change the connected state of the phase shifter meeting the preset condition to the closing; and the width adjustment module is configured to adjust, with at least one phase shifter having the connected state in the closing, the width of the beam corresponding to the low-load terminal, the beam being formed by the electromagnetic wave transmitted from the BS to the low-load terminal or the electromagnetic wave received from the low-load terminal.

According to a fourth aspect, an embodiment of the present disclosure further provides a storage medium including a computer executable instruction, where the computer executable instruction is configured to implement the beamforming method based on phase shifter switching control in any one of the embodiments of the present disclosure when executed by a computer processor.

The technical solutions in the embodiments of the present disclosure include: acquiring a channel vector of a channel of each of low-load terminals, the channel being a channel at a low-load side of the low-load terminal; acquiring, based on the channel vector, contribution degrees of phase shifters corresponding to the channel, where there are a plurality of the phase shifters corresponding to the channel, and the phase shifters are located in a BS; sequentially changing a connected state of each of the phase shifters from closing to opening based on the contribution degrees of the phase shifters corresponding to the channel, calculating a to-be-processed SINR of the low-load terminal after changing the connected state of the phase shifter once, stopping to change the connected state of the phase shifter if the to-be-processed SINR meets a preset condition, and changing the connected state of the phase shifter meeting the preset condition to the closing; and adjusting, with at least one phase shifter having the connected state in the closing, a width of a beam corresponding to the low-load terminal, the beam being formed by an electromagnetic wave transmitted from the BS to the low-load terminal or an electromagnetic wave received from the low-load terminal. Through the technical solutions in the embodiments of the present disclosure, while not affecting transmission of the electromagnetic wave at the low-load side of the low-load terminal, the present disclosure adjusts a width of the beam of the low-load terminal by switching off a part of the phase shifters, thereby reducing the power consumption of the system, and improving the overall energy efficiency of the system.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

In the drawings.

DETAILED DESCRIPTION OF THE EMBODIMENTS

The technical solutions in embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Before the technical solutions in embodiments of the present disclosure are elaborated, exemplary descriptions are first made to scenarios to which the embodiments of the present disclosure are applied:

Nowadays, conventional fully-digital beamforming structures are impractical due to a high power consumption. Millimeter-wave large-scale arrays usually use a hybrid digital-analog beamforming structure, in which digital and analog parts are connected by radio-frequency (RF) links. Each of the RF links is connected to all antennas. Phases of signals depend on connections with the antennas and are altered by phase shifters 12, thereby implementing analog beamforming. The signals come from a digitally encoded signal sequence in a data stream. For large-scale arrays operating at millimeter-wave bands, there may be thousands of antennas. Despite a low power consumption of a single phase shifter 12, the total power consumptions will be very high, as well. Moreover, it is a trend to access diverse devices with different performance requirements to a wireless communication system. Due to diverse performance requirements of the terminals in the wireless communication system, loads on an uplink channel and a downlink channel are unbalanced. For example, smartphones and tablet computers for browsing high-definition videos or downloading large files need a larger downlink channel capacity than an uplink channel capacity, while flying UAVs or real-time high-definition monitoring photographing devices need a larger uplink channel capacity than a downlink channel capacity. Even for devices of a same type, channel capacities at low-load sides may also be varied from each other. However, the unbalanced loads of the terminals cannot be adjusted in the wireless communication system to reduce the energy efficiency of the system. While not affecting transmission of a data stream of the low-load terminal, the present disclosure can adjust a width of a beam, and reduce a power consumption of the low-load terminal, thereby reducing the power consumption of the system, and improving the overall energy efficiency of the system.

Embodiment 1

Figure 1:
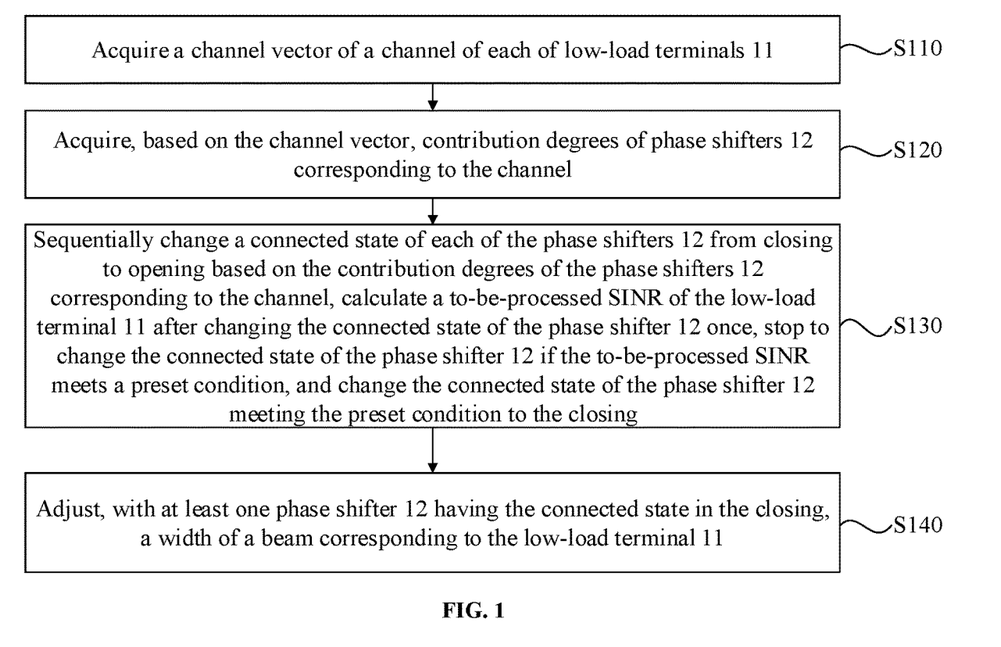
FIG. 1 is a schematic flowchart of a beamforming method based on phase shifter switching control according to Embodiment 1 of the present disclosure.

FIG. 1 is a schematic flowchart of a beamforming method based on phase shifter switching control according to an embodiment of the present disclosure. The embodiment can be applied to adjust a width of a beam of a low-load terminal. The method may be executed by a beamforming system based on phase shifter switching control. The system may be implemented in a form of software and/or hardware.

As shown in FIG. 1, the beamforming method based on phase shifter switching control in the embodiment of the present disclosure specifically includes the following steps:

S110: Acquire a channel vector of a channel of each of low-load terminals 11.

The terminal refers to a terminal capable of transmitting an electromagnetic wave with a BS 13, such as a mobile phone and a tablet computer. The low-load terminal 11 is proposed relative to a high-load terminal. There is a low load in case of a load imbalance between an uplink channel and a downlink channel of the terminal. The terminal in that case is called the low-load terminal 11. It is to be noted that the channel in the embodiment of the present disclosure is a channel at a low-load side of the low-load terminal 11. A series of operations on the low-load terminal 11, such as acquisition of the channel vector, calculation of the initial SINR, and calculation of the to-be-processed SINR, are all operations on the low-load side of the low-load terminal 11. The phase shifters 12 correspond to the channel at the low-load side of the low-load terminal 11. It is to be understood that the low load may be the load on the uplink channel, and may also be the load on the downlink channel. For example, when the terminal is used to browse videos, there needs a larger downlink channel capacity than an uplink channel capacity, namely the uplink channel is the low-load side, and the terminal is the low-load terminal 11.

The channel refers to a communication device between the BS 13 and the terminal, with a function to transmit the data stream from the BS 13 to the terminal, or transmit the data stream from the terminal to the BS 13. The data stream takes the electromagnetic wave as the carrier. The channel vector refers to quantization on the channel of the low-load terminal 11. It represents the channel in a mathematical form, for ease of subsequent operations. Each channel element in the channel vector may be a value obtained after a data stream from an antenna of a transmitter to an antenna of a receiver is transmitted through the channel. A number of channel elements in each channel vector is the same as a number of phase shifters 12 corresponding to the channel of the low-load terminal 11. As the phase shifters 12 are the same as BA antennas quantitatively, the number of channel elements is the same as a number of BS antennas corresponding to the low-load terminal 11. Herein, connected states of the phase shifters 12 are considered as closing. The receiver may be the terminal, and may also be the BS 13. The terminal includes a terminal antenna. The BS 13 includes the BS antennas. In the embodiment of the present disclosure, before transmission of the data stream between the BS 13 and the terminal, a pilot signal is transmitted to acquire the channel vector. It is to be noted that the embodiment of the present disclosure is applied to a wireless communication system using a TDD mode. The wireless communication system may include one BS 13 and a plurality of the terminals. The uplink channel and the downlink channel of each terminal refer to a same channel, except that electromagnetic waves transmitted at different time have different directions. If an electromagnetic wave is transmitted from the terminal to the BS 13, the channel is called the uplink channel. If an electromagnetic wave is transmitted from the BS 13 to the terminal, the channel is called the downlink channel.

Specifically, the acquisition for the channel vector of the channel of the low-load terminal 11 is beneficial to subsequently calculate contribution degrees of phase shifters 12 corresponding to the channel of the low-load terminal 11.

Further, before the step of acquiring a channel vector of each of low-load terminals 11, the beamforming method in the embodiment of the present disclosure may further include: Determine, when detecting that to-be-transmitted data streams on an uplink channel and a downlink channel of a terminal are different in size, that the terminal is the low-load terminal 11, where the to-be-transmitted data streams each are transmitted in a form of the electromagnetic wave, and the electromagnetic wave forms the beam.

The to-be-transmitted data stream is a data stream needing to be transmitted. The transmitter for the to-be-transmitted data stream may be the terminal, and may also be the BS 13. The transmitter transmits the to-be-transmitted data stream on the uplink channel when being the terminal, and transmits the to-be-transmitted data stream on the downlink channel when being the BS 13. The to-be-transmitted data stream is transmitted in the form of the electromagnetic wave, and the electromagnetic wave forms the beam. Optionally, the data stream on the downlink channel forms the electromagnetic wave through a beamformer. The beamformer refers to a hybrid beamformer, including a digital beamformer and an analog beamformer.

Specifically, when the to-be-transmitted data streams on the uplink channel and the downlink channel of the terminal are different in size, loads on the uplink channel and the downlink channel of the terminal are unbalanced, namely there are the high-load side and the low-load side, and the terminal in this case is the low-load terminal 11. The size of the data stream may be a size of data in a memory.

S120: Acquire, based on the channel vector, contribution degrees of phase shifters 12 corresponding to the channel.

There are a plurality of the phase shifters 12 corresponding to the channel. The phase shifters 12 are located in the BS 13. A plurality of the phase shifters 12 are provided in the BS 13. Each of the phase shifters 12 is connected to one of the BS antennas. A plurality of the BS antennas are formed into a BS antenna array. The electromagnetic wave transmitted on the uplink channel and the downlink channel will pass through the phase shifters 12 in the BS 13. Any change in connected states of the phase shifters 12 will have an influence on the transmission efficiency of the electromagnetic wave, namely the width of the beam is changed, thereby influencing the energy efficiency of the system. The contribution degree may be an influencing degree to an initial SINR. Relevant contents on the initial SINR will be described in the following embodiment.

Specifically, the contribution degrees of the phase shifters 12 corresponding to the channel of the low-load terminal 11 are acquired according to the channel vector. The phase shifters 12 can be operated based on the contribution degrees to change the width of the beam.

S130: Sequentially change a connected state of each of the phase shifters 12 from closing to opening based on the contribution degrees of the phase shifters 12 corresponding to the channel, calculate a to-be-processed SINR of the low-load terminal 11 after changing the connected state of the phase shifter 12 once, stop to change the connected state of the phase shifter 12 if the SINR meets a preset condition, and change the connected state of the phase shifter 12 meeting the preset condition to the closing.

The connected state of the phase shifter 12 includes the closing and the opening. When the connected state of the phase shifter 12 is the opening, the phase shifter 12 is switched off. When the connected state of the phase shifter 12 is the closing, the phase shifter 12 is switched on. The preset condition may be a condition that the to-be-processed SINR is less than a preset value, etc. It is to be understood that the initial connected state of the phase shifter 12 is the closing, namely the phase shifter 12 is switched on. Switching off the phase shifter is to change the connected state of the phase shifter from the closing to the opening.

Specifically, the connected state of each of the connected phase shifters 12 is sequentially changed from the closing to the opening according to the contribution degrees of the phase shifters 12 corresponding to the channel of the low-load terminal 11, and the to-be-processed SINR of the low-load terminal 11 is calculated based on remaining phase shifters 12 after the connected state of the phase shifter 12 is changed once. If the to-be-processed SINR does not meet the preset condition, the connected state of a next phase shifter 12 is changed continuously. If the to-be-processed SINR meets the preset condition, the connected state of the phase shifter 12 is stopped to be changed, and the connected state of the phase shifter 12 meeting the preset condition is changed to the closing.

Further, in the embodiment of the present disclosure, the step of sequentially changing a connected state of each of the phase shifters 12 from closing to opening based on the contribution degrees of the phase shifters 12 corresponding to the channel includes: Sort, for the phase shifters 12 corresponding to the channel, the contribution degrees of the phase shifters 12 in an ascending manner, and sequentially change the connected state of each of the connected phase shifters 12 from the closing to the opening.

Specifically, the contribution degrees are sorted in the ascending manner, and the connected state of each of the phase shifters 12 is changed from a phase shifter 12 with a minimum contribution degree. The phase shifter 12 with the low contribution degree has a less influence on the to-be-processed SINR, and thus the phase shifter 12 with the low contribution degree is switched off first.

S140: Adjust, with at least one phase shifter 12 having the connected state in the closing, a width of a beam corresponding to the low-load terminal 11.

The beam is formed by an electromagnetic wave transmitted from the BS 13 to the low-load terminal 11 or an electromagnetic wave received from the low-load terminal 11. Exemplarily, when the beam becomes wider, the transmission efficiency of the electromagnetic wave is slowed down, namely the transmission efficiency of the data stream is slowed down.

Specifically, by adjusting, with at least one phase shifter 12 having the connected state in the closing, the width of the beam corresponding to the low-load terminal 11, the present disclosure reduces the power consumption, and improves the overall energy efficiency of the system, while not affecting transmission of the data stream at the low-load side of the low-load terminal 11.

It is to be understood that the energy efficiency is obtained by dividing the power consumption from spectral efficiency. The power consumption includes losses of the transmitted power and all hardware devices. The hardware devices include the phase shifters 12, the BS antennas, the terminal antenna, etc.

The spectral efficiency refers to an upper limit of an information transmission rate, namely total information transmission efficiency R of the system:

$$R = \sum_{k=1}^{K} \log(1 + \text{SINR}_k)$$

where, $\text{SINR}_k$ represents an initial SINR of a kth low-load terminal 11, and there are K low-load terminals 11.

The technical solutions in the embodiments of the present disclosure are implemented by: acquiring a channel vector of a channel of each of low-load terminals 11, the channel being a channel at a low-load side of the low-load terminal 11; acquiring, based on the channel vector, contribution degrees of phase shifters 12 corresponding to the channel, where there are a plurality of the phase shifters 12 corresponding to the channel, and the phase shifters 12 are located in a BS 13; sequentially changing a connected state of each of the phase shifters 12 from closing to opening based on the contribution degrees of the phase shifters 12 corresponding to the channel, calculating a to-be-processed SINR of the low-load terminal 11 after changing the connected state of the phase shifter 12 once, stopping to change the connected state of the phase shifter 12 if the to-be-processed SINR meets a preset condition, and changing the connected state of the phase shifter 12 meeting the preset condition to the closing; and adjusting, with at least one phase shifter 12 having the connected state in the closing, a width of a beam corresponding to the low-load terminal 11, the beam being formed by an electromagnetic wave transmitted from the BS 13 to the low-load terminal 11 or an electromagnetic wave received from the low-load terminal 11. Through the technical solutions in the embodiment of the present disclosure, while not affecting transmission of the electromagnetic wave at the low-load side of the low-load terminal, the beamforming device adjusts a width of the beam of the low-load terminal by switching off a part of the phase shifters, thereby reducing the power consumption of the system, and improving the overall energy efficiency of the system.

Embodiment 2

Figure 2:
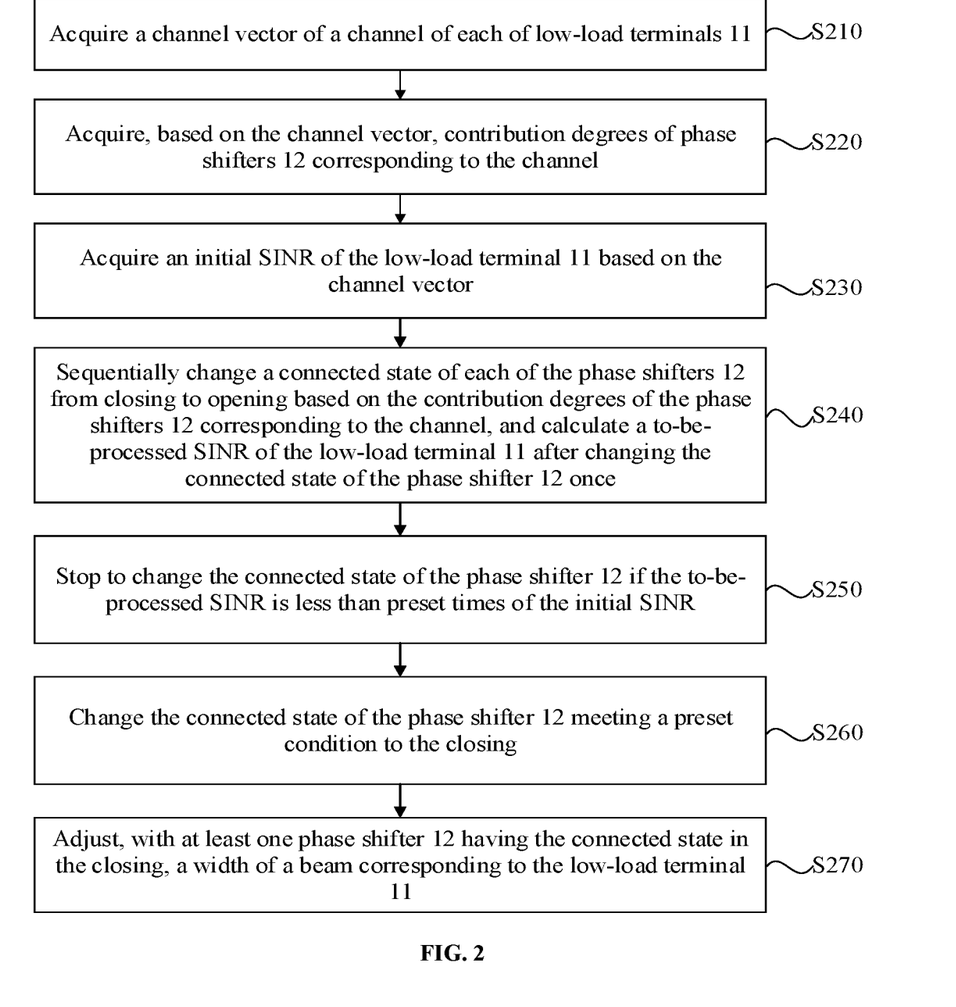
FIG. 2 is a schematic flowchart of a beamforming method based on phase shifter switching control according to Embodiment 2 of the present disclosure.

FIG. 2 is a schematic flowchart of a beamforming method based on phase shifter 12 switching control according to an embodiment of the present disclosure. On the basis of optional solutions in the above embodiment, there are further a step of acquiring an initial SINR and a step of subdividing Step S130 based on the initial SINR in the embodiment of the present disclosure. Technical terms same as or similar to those in the above embodiments will not be repeatedly described.

S210: Acquire a channel vector of a channel of each of low-load terminals 11.

S220: Acquire, based on the channel vector, contribution degrees of phase shifters 12 corresponding to the channel.

S230: Acquire an initial SINR of the low-load terminal 11 based on the channel vector.

The initial SINR refers to an SINR of the low-load terminal 11 in a condition that connected states of all phase shifters 12 corresponding to the channel are in the closing, namely the phase shifters 12 are all switched on.

Specifically, the acquisition for the initial SINR is beneficial to subsequently process the to-be-processed SINR of the low-load side.

Further, in the embodiment of the present disclosure, there are a plurality of the low-load terminals 11. The step of acquiring an initial SINR of the low-load terminal 11 based on the channel vector includes: Input the channel vector of the low-load terminal 11 to an initial SINR function to acquire the initial SINR of the low-load terminal 11:

$$\text{SINR}_k = \frac{P_t/K \left| h_k^H F_{RF} [F_{BB}]_{:,k} \right|^2}{\sigma^2 + P_t/K \left| h_k^H \sum_{u \neq k}^{K} F_{RF} [F_{BB}]_{:,u} \right|^2}$$

where, $\text{SINR}_k$ represents an initial SINR of a kth low-load terminal 11, k represents a serial number of the low-load terminal 11, $h_k$ represents a channel vector of the kth low-load terminal, $P_t$ is a transmitted power of the BS 13 in a system, $F_{RF}$ is a matrix of an analog beamformer, $F_{BB}$ is a matrix of a digital beamformer, $[F_{BB}]_{:,k}$ represents a kth column of elements of the digital beamformer, $[F_{BB}]_{:,u}$ represents a uth column of elements of the digital beamformer, $\sigma^2$ represents a noise power, K represents a number of the low-load terminals 11, each of the phase shifters 12 is connected to one switch, and the analog beamformer includes at least one phase shifter 12 and a switch connected to the at least one phase shifter 12.

Specifically, the initial SINR obtained when the phase shifters 12 at the low-load side of the low-load terminal 11 are all switched on may also be an SINR at a high-load side of the low-load terminal 11. When all phase shifters 12 at the low-load side are switched on, the low-load side and the high-load side have a same SINR.

S240: Sequentially change a connected state of each of the phase shifters 12 from closing to opening based on the contribution degrees of the phase shifters 12 corresponding to the channel, and calculate a to-be-processed SINR of the low-load terminal 11 after changing the connected state of the phase shifter 12 once.

Further, in the embodiment of the present disclosure, the step of acquiring, based on the channel vector, contribution degrees of phase shifters 12 corresponding to the channel includes: Input the channel vector of the low-load terminal 11 to a contribution degree function to acquire a contribution degree of each of the phase shifters 12 corresponding to the channel:

$$\delta(a_k) = \sum_{k=1}^{K} \frac{\gamma_k |[h_k]_{a_k}|^2}{\Sigma_{u=1}^{K} ([h_u]_{a_k})^H [h_k]_{a_k}}$$

where, $\delta(a_k)$ represents a contribution degree of an $a_k$ th phase shifter 12 corresponding to a channel of the kth low-load terminal 11, $h_u$ represents a channel vector of a uth low-load terminal 11, $h_u$ falling within a range of [1, K], $h_k$ represents the channel vector of the kth low-load terminal 11, $[h_k]_{a_k}$ represents a channel element, corresponding to an $a_k$th BS antenna, in the channel vector of the kth low-load terminal 11, $[h_u]_{a_k}$ represents a channel element, corresponding to the $a_k$th BS antenna, in the channel vector of the uth low-load terminal 11, $\gamma_k$ represents the preset times, the BS 13 includes a plurality of the BS antennas, and each of the phase shifters 12 is connected to one of the BS antennas.

Further, in the embodiment of the present disclosure, the step of calculating a to-be-processed SINR of the low-load terminal 11 includes: Calculate, for the low-load terminal 11, the channel vector of the low-load terminal 11, the connected state of the phase shifter 12, and a number of BS antennas through a to-be-processed SINR function to acquire the to-be-processed SINR of the low-load terminal 11:

$$\tau_k(S_k) = \frac{P_t/K |h_{k,s}^H h_{k,s}|^2}{\sigma_n^2 + P_t/K \left| h_{k,s}^H \sum_{u \neq k}^{K} h_{u,s} \right|^2}$$

where, $\tau_k(S_k)$ represents a to-be-processed SINR of the kth low-load terminal 11, $h_{k,s} = h_k S_k$ represents an updated channel vector after a kth phase shifter 12 is switched off, $S_k$ represents a selection matrix of the kth low-load terminal 11, a number of rows and a number of columns in the selection matrix depending on the number of the BS antennas, the selection matrix being a diagonal matrix and an element on a diagonal line being 0 or 1, 0 indicating that the connected state of the phase shifter 12 is the opening, and 1 indicating that the connected state of the phase shifter 12 is the closing, and $\sigma_n^2$ represents equivalent noise. In the embodiment of the present disclosure, a zero norm of the selection matrix $S_k$ is used as an objective function to indicate a number of the phase shifters 12 having the connected states in the closing. $S_k$ may be defined as an $N_r \times N_r$ selection matrix corresponding to the kth low-load terminal 11, $N_r$ being the number of BS antennas. Certainly, the number of BS antennas is the same as the number of phase shifters 12, and there are $N_r$ phase shifters 12.

Specifically, in the embodiment of the present disclosure, the phase shifters 12 are numbered to distinguish different phase shifters 12. On the diagonal line of the selection matrix, when the connected state of the phase shifter 12 is the opening, the element on the diagonal line of the selection matrix corresponding to the phase shifter 12 may be changed from 1 to 0. Optionally, all phase shifters 12 are initially switched on.

S250: Stop to change the connected state of the phase shifter 12 if the to-be-processed SINR is less than preset times of the initial SINR.

The preset times may be preliminarily set times, such as 0.12 times, and 1.3 times. The specific value of the preset times may be determined according to actual conditions, and is not limited herein.

Specifically, when the to-be-processed SINR is less than the preset times of the initial SINR, the connected state of the phase shifter 12 is stopped to be changed. Specifically, when the to-be-processed SINR is greater than or equal to the preset times of the initial SINR, the connected state of the phase shifter 12 is changed continuously.

S260: Change the connected state of the phase shifter 12 meeting a preset condition to the closing.

It is to be noted that the preset condition is a condition that the to-be-processed SINR is less than the preset times of the initial SINR. Exemplarily, if the to-be-processed SINR calculated is less than the preset times of the initial SINR after the connected state of the phase shifter numbered as 45 is changed to the opening, the connected state of the phase shifter 12 is stopped to be changed, and the connected state of the phase shifter numbered as 45 is changed from the opening to the closing.

S270: Adjust, with at least one phase shifter 12 having the connected state in the closing, a width of a beam corresponding to the low-load terminal 11.

Figure 3:
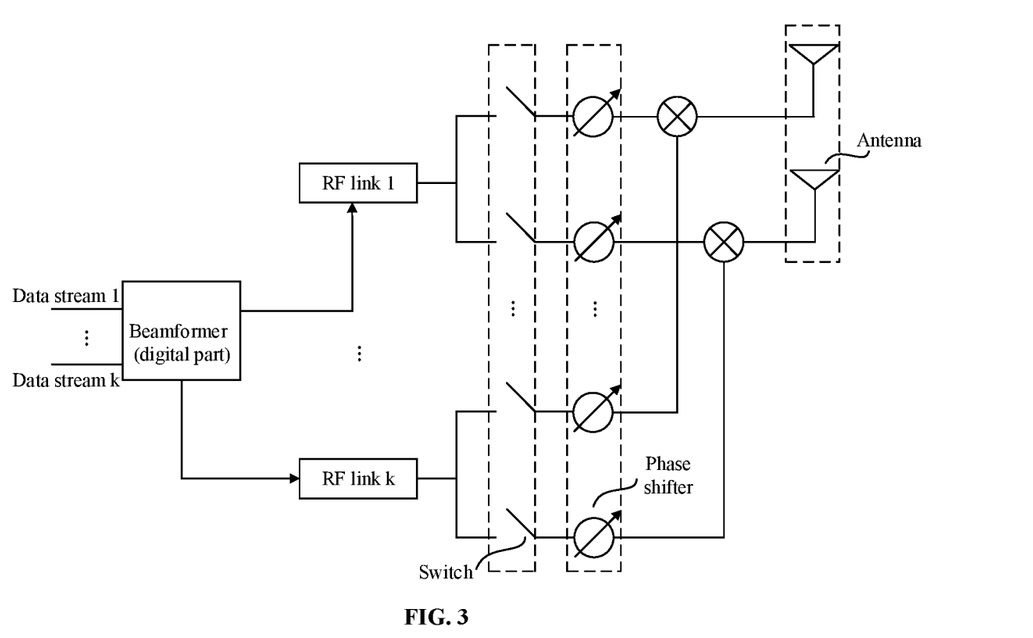
FIG. 3 is a schematic view of a beamforming device based on phase shifter switching control according to Embodiment 2 of the present disclosure.

Exemplarily, referring to FIG. 3, data streams from 1 to k are sequentially to-be-transmitted data streams needed by low-load terminal 1 to low-load terminal k. The to-be-transmitted data streams are located in the BS 13. The data streams 1 to k are denoised by a digital beamformer Vd in the BS 13. After denoised, the data streams 1 to k sequentially pass through corresponding RF links 1 to k to reach an analog beamformer Va. The data streams are transmitted to the low-load terminals 11 by the BS antennas after processed by the analog beamformer. It is to be understood that each RF link corresponds to one data stream, and corresponds to one low-load terminal 11. There may be K low-load terminals 11, including the low-load terminal 1 to the low-load terminal k. The analog beamformer Va includes switches and phase shifters 12 connected to the switches. Each phase shifter 12 includes one end connected to one BS antenna, and the other end connected to one switch. There are $N_r$ BS antennas, as well as $N_r$ phase shifters 12 and switches. Each RF link includes one end connected to the digital beamformer, and the other end connected to at least one phase shifter 12 corresponding to the low-load terminal 11. Between the phase shifter 12 and the RF link, one switch is provided, namely the switch includes one end connected to the RF link, and the other end connected to the phase shifter 12. By controlling the switches to change the connected states of the phase shifters 12, the present disclosure reduces the power consumption at the low-load side of the low-load terminal 11, and improves the overall energy efficiency of the system. Optionally, zero-forcing (ZF) digital precoding may be used to denoise the data streams. The data streams 1 to k are subjected to the ZF digital precoding through the digital beamformer Vd. The digital beamformer is implemented as follows: when the channel vector is $h_1, \ldots, h_k$ sequentially, the equivalent channel after the channel vector passes through the analog beamformer is $H_e=[h_1^H V_A, \ldots, h_k^H V_A]$, and the ZF precoding digital beamformer is $V_D=H_e^H(H_e H_e^H)^{-1}$.

Compared with a hybrid digital-analog structure in the prior art, each phase shifter 12 is provided with the switch. By switching off the phase shifters 12, the total power consumption of the system can be reduced, and the energy efficiency of the system can be improved. It is to be noted that the wireless communication system uses the TDD mode to transmit the electromagnetic wave in the embodiment of the present disclosure. Therefore, the data stream may be transmitted from the BS 13 to the terminal, and may also be transmitted from the terminal to the BS 13. The data stream is transmitted between the BS antenna and the terminal antenna in the form of the electromagnetic wave.

Exemplarily, it is assumed that the low-load terminal 11 for browsing high-definition 4K videos has a downlink bandwidth of about 50 Mbps, and an uplink bandwidth of only 0.5 Mbps. It is to be understood that the bandwidth of the low-load terminal 11 can be obtained on the basis of known channel capacity and spectral efficiency of the low-load terminal 11. With the technical solutions in the embodiment of the present disclosure, the performance constraint at the low-load side of the low-load terminal 11 may be $\gamma_k=0.15$, namely the preset times in the above embodiment are 0.15, and thus there are only about 20% of the phase shifters 12 that need to work. With the BS 13 serving four terminals and including 256 BS antennas as an example, 820 phase shifters 12 can be switched off for the four terminals. Based on the power consumption of 35 mV per phase shifter 12, the power consumption of 28.7 W can be saved. In addition, there may be different performance constraints for low-load sides of various low-load terminals 11 in the embodiment of the present disclosure. With four low-load terminals 11 having $\gamma_1=0.65$, $\gamma_2=0.6$, $\gamma_3=0.55$, $\gamma_4=0.5$ as an example, the energy efficiency of the system can be improved by 2.3 times according to the technical solutions in the embodiment of the present disclosure.

S270: Adjust, with at least one phase shifter 12 having the connected state in the closing, a width of a beam corresponding to the low-load terminal 11.

The technical solutions in the embodiments of the present disclosure are implemented by: acquiring a channel vector of a channel of each of low-load terminals 11; acquiring, based on the channel vector, contribution degrees of phase shifters 12 corresponding to the channel, where there are a plurality of the phase shifters 12 corresponding to the channel, and the phase shifters 12 are located in a BS 13; acquiring an initial SINR of the low-load terminal 11 based on the channel vector; sequentially changing a connected state of each of the phase shifters 12 from closing to opening based on the contribution degrees of the phase shifters 12 corresponding to the channel, calculating a to-be-processed SINR of the low-load terminal 11 after changing the connected state of the phase shifter 12 once, stopping to change the connected state of the phase shifter 12 if the to-be-processed SINR is less than preset times of the initial SINR, and changing the connected state of the phase shifter 12 meeting the preset condition to the closing; and adjusting, with at least one phase shifter 12 having the connected state in the closing, a width of a beam corresponding to the low-load terminal 11, the beam being formed by an electromagnetic wave transmitted from the BS 13 to the low-load terminal 11 or an electromagnetic wave received from the low-load terminal 11. Through the technical solutions in the embodiment of the present disclosure, while not affecting transmission of the electromagnetic wave at the low-load side of the low-load terminal, the beamforming method adjusts a width of the beam of the low-load terminal by switching off a part of the phase shifters, thereby reducing the power consumption of the system, and improving the overall energy efficiency of the system.

Embodiment 3

Figure 4:
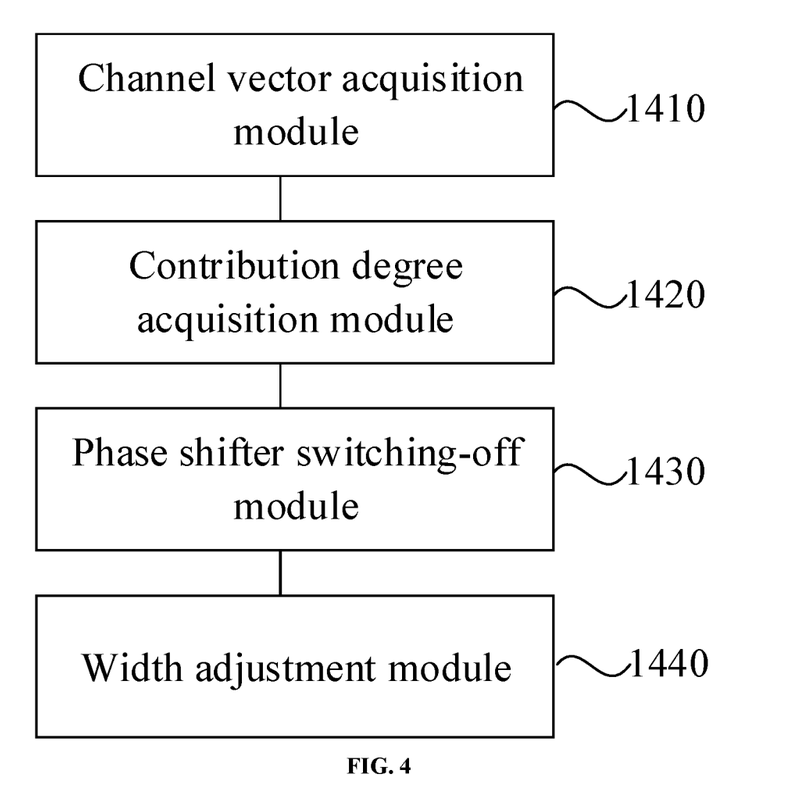
FIG. 4 is a schematic structural view of a beamforming device based on phase shifter switching control according to Embodiment 3 of the present disclosure.

FIG. 4 is a structural schematic view of a beamforming device based on phase shifter switching control according to an embodiment of the present disclosure. The beamforming device based on phase shifter switching control in the embodiment of the present disclosure can execute the beamforming method based on phase shifter switching control in any embodiment of the present disclosure, and have the same functional modules and beneficial effects as the method. The device includes: a channel vector acquisition module 1410, a contribution degree acquisition module 1420, a phase shifter switching-off module 1430, and a width adjustment module 1440.

The channel vector acquisition module 1410 is configured to acquire a channel vector of a channel of each of low-load terminals 11, the channel being a channel at a low-load side of the low-load terminal 11. The contribution degree acquisition module 1420 is configured to acquire, based on the channel vector, contribution degrees of phase shifters 12 corresponding to the channel, where there are a plurality of the phase shifters 12 corresponding to the channel, and the phase shifters 12 are located in a BS 13. The phase shifter switching-off module 1430 is configured to sequentially change a connected state of each of the phase shifters 12 from closing to opening based on the contribution degrees of the phase shifters 12 corresponding to the channel, calculate a to-be-processed SINR of the low-load terminal 11 after changing the connected state of the phase shifter 12 once, stop to change the connected state of the phase shifter 12 if the to-be-processed SINR meets a preset condition, and change the connected state of the phase shifter 12 meeting the preset condition to the closing. The width adjustment module 1440 is configured to adjust, with at least one phase shifter 12 having the connected state in the closing, a width of a beam corresponding to the low-load terminal 11, the beam being formed by an electromagnetic wave transmitted from the BS 13 to the low-load terminal 11 or an electromagnetic wave received from the low-load terminal 11.

Further, in the embodiment of the present disclosure, the device further includes: a low-load terminal determination module configured to determine, when detecting that to-be-transmitted data streams on an uplink channel and a downlink channel of a terminal are different in size, that the terminal is the low-load terminal 11, where the to-be-transmitted data streams each are transmitted in a form of the electromagnetic wave, and the electromagnetic wave forms the beam.

Further, in the embodiment of the present disclosure, the device further includes: an initial SINR acquisition module configured to acquire an initial SINR of the low-load terminal 11 based on the channel vector. The phase shifter switching-off module 1430 is further configured to: stop to change the connected state of the phase shifter 12 if the to-be-processed SINR is less than preset times of the initial SINR.

Further, in the embodiment of the present disclosure, there are a plurality of the low-load terminals 11. The initial SINR acquisition module is further configured to: input the channel vector of the low-load terminal 11 to an initial SINR function to acquire the initial SINR of each of the low-load terminals 11:

$$SINR_k = \frac{P_t/K \left| h_k^H F_{RF} [F_{BB}]_{:,k} \right|^2}{\sigma^2 + P_t/K \left| h_k^H \sum_{u \neq k}^{K} F_{RF} [F_{BB}]_{:,u} \right|^2}$$

where, $SINR_k$ represents an initial SINR of a kth low-load terminal 11, k represents a serial number of the low-load terminal 11, $h_k$ represents a channel vector of the kth low-load terminal, $P_t$ is a transmitted power of the BS 13 in a system, $F_{RF}$ is a matrix of an analog beamformer, $F_{BB}$ is a matrix of a digital beamformer, $[F_{BB}]_{:,k}$ represents a kth column of elements of the digital beamformer, $[F_{BB}]_{:,u}$ represents a uth column of elements of the digital beamformer, $\sigma^2$ represents a noise power, K represents a number of the low-load terminals 11, each of the phase shifters 12 is connected to one switch, and the analog beamformer includes at least one phase shifter 12 and a switch connected to the at least one phase shifter 12.

Further, in the embodiment of the present disclosure, the contribution degree acquisition module 1420 is further configured to:

input the channel vector of the low-load terminal 11 to a contribution degree function to acquire a contribution degree of each of the phase shifters 12 corresponding to the channel:

$$\delta(a_k) = \sum_{k=1}^{K} \frac{\gamma_k \left| [h_k]_{a_k} \right|^2}{\Sigma_{u=1}^{K} ([h_u]_{a_k})^H [h_k]_{a_k}}$$

where, $\delta(a_k)$ represents a contribution degree of an $a_k$th phase shifter 12 corresponding to a channel of the kth low-load terminal 11, $h_u$ represents a channel vector of a uth low-load terminal 11, $h_u$ falling within a range of [1, K], $h_k$ represents the channel vector of the kth low-load terminal 11, $[h_k]_{a_k}$ represents a channel element, corresponding to an $a_k$th BS antenna, in the channel vector of the kth low-load terminal 11, $[h_u]_{a_k}$ represents a channel element, corresponding to the $a_k$th BS antenna, in the channel vector of the uth low-load terminal 11, $\gamma_k$ represents the preset times, the BS 13 includes a plurality of the BS antennas, and each of the phase shifters 12 is connected to one of the BS antennas.

Further, in the embodiment of the present disclosure, the phase shifter switching-off module 1430 is further configured to:

calculate, for the low-load terminals 11, the channel vector of the low-load terminal 11, the connected state of the phase shifter 12, and a number of the BS antennas through a to-be-processed SINR function to acquire the to-be-processed SINR of the low-load terminal 11:

$$\tau_k(S_k) = \frac{P_t/K \left| h_{k,s}^H h_{k,s} \right|^2}{\sigma_n^2 + P_t/K \left| h_{k,s}^H \sum_{u \neq k}^{K} h_{u,s} \right|^2}$$

where, $\tau_k(S_k)$ represents a to-be-processed SINR of the kth low-load terminal 11, $h_{k,s} = h_k S_k$ represents an updated channel vector after a kth phase shifter 12 is switched off, $S_k$ represents a selection matrix of the kth low-load terminal 11, a number of rows and a number of columns in the selection matrix depending on the number of the BS antennas, the selection matrix being a diagonal matrix and an element on a diagonal line being 0 or 1, 0 indicating that the connected state of the phase shifter 12 is the opening, and 1 indicating that the connected state of the phase shifter 12 is the closing, and a represents equivalent noise.

Further, in the embodiment of the present disclosure, the phase shifter switching-off module 1430 is further configured to:

sort, for the phase shifters 12 corresponding to the channel, the contribution degrees of the phase shifters 12 in an ascending manner, and sequentially change the connected state of each of the connected phase shifters 12 from the closing to the opening.

The embodiment of the present disclosure is implemented by: acquiring a channel vector of a channel of each of low-load terminals 11; acquiring, based on the channel vector, contribution degrees of phase shifters 12 corresponding to the channel, where there are a plurality of the phase shifters 12 corresponding to the channel, and the phase shifters 12 are located in a BS 13; sequentially changing a connected state of each of the phase shifters 12 from closing to opening based on the contribution degrees of the phase shifters 12 corresponding to the channel, calculating a to-be-processed SINR of the low-load terminal 11 after changing the connected state of the phase shifter 12 once, stopping to change the connected state of the phase shifter 12 if the to-be-processed SINR meets a preset condition, and changing the connected state of the phase shifter 12 meeting the preset condition to the closing; and adjusting, with at least one phase shifter 12 having the connected state in the closing, a width of a beam corresponding to the low-load terminal 11, the beam being formed by an electromagnetic wave transmitted from the BS 13 to the low-load terminal 11 or an electromagnetic wave received from the low-load terminal 11. Through the technical solutions in the embodiment of the present disclosure, while not affecting transmission of the electromagnetic wave at the low-load side of the low-load terminal, the beamforming device adjusts a width of the beam of the low-load terminal by switching off a part of the phase shifters, thereby reducing the power consumption of the system, and improving the overall energy efficiency of the system.

It is to be noted that the modules included in the above device are merely divided based on a functional logic, but are not limited to the foregoing division, as long as the corresponding functions can be implemented. In addition, specific names of the functional modules are merely for the convenience of distinguishing from each other, and are not used to limit the protection scope of the present disclosure.

Embodiment 4

Figure 5:
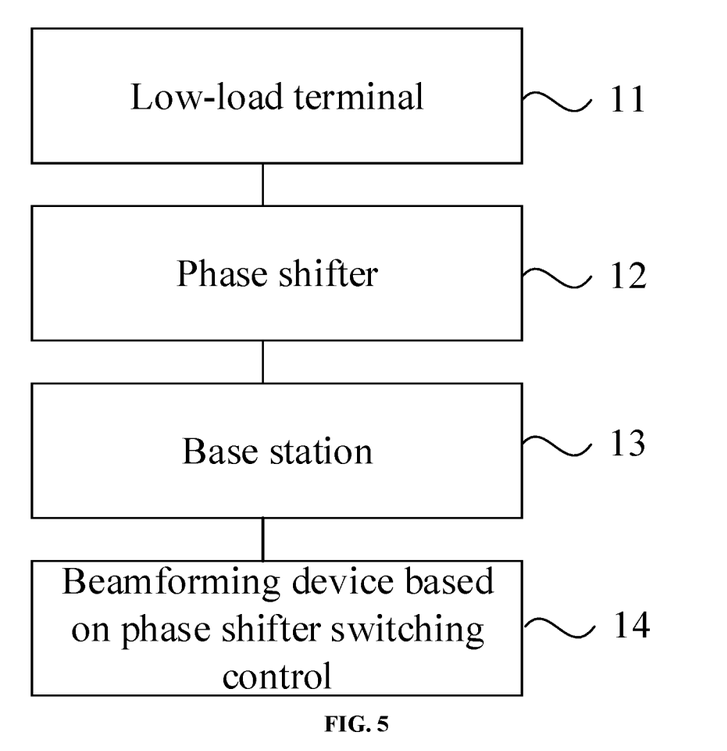
FIG. 5 is a schematic structural view of a wireless communication system according to Embodiment 4 of the present disclosure.

FIG. 5 is a structural schematic view of a wireless communication system according to an embodiment of the present disclosure. The wireless communication system in the embodiment of the present disclosure can execute the beamforming method based on phase shifter switching control in any embodiment of the present disclosure, and have the same functional modules and beneficial effects as the method. The system includes low-load terminals 11, a plurality of phase shifters 12, a BS 13, and a beamforming device 14 based on phase shifter switching control.

The low-load terminals 11 each are configured to transmit an electromagnetic wave to the BS 13, or receive an electromagnetic wave from the BS 13. The plurality of phase shifters 12 are located in the BS 13, and configured to adjust a width of a beam, the beam being formed by the electromagnetic wave transmitted from the low-load terminal 11 to the BS 13 or the electromagnetic wave received from the BS 13. The beamforming device 14 based on phase shifter 12 switching control includes a channel vector acquisition module 1410, a contribution degree acquisition module 1420, a phase shifter switching-off module 1430, and a width adjustment module 1440. The channel vector acquisition module 1410 is configured to acquire a channel vector of a channel of the low-load terminal 11, the channel being a channel at a low-load side of the low-load terminal 11. The contribution degree acquisition module 1420 is configured to acquire, based on the channel vector, contribution degrees of phase shifters 12 corresponding to the channel. There are a plurality of the phase shifters 12 corresponding to the channel. The phase shifter switching-off module 1430 is configured to sequentially change a connected state of each of the phase shifters 12 from closing to opening based on the contribution degrees of the phase shifters 12 corresponding to the channel, calculate a to-be-processed SINR of the low-load terminal 11 after changing the connected state of the phase shifter 12 once, stop to change the connected state of the phase shifter 12 if the to-be-processed SINR meets a preset condition, and change the connected state of the phase shifter meeting the preset condition into the closing. The width adjustment module 1440 is configured to adjust, with at least one phase shifter 12 having the connected state in the closing, a width of a beam corresponding to the low-load terminal 11. The beam is formed by the electromagnetic wave transmitted from the BS 13 to the low-load terminal 11 or the electromagnetic wave received from the low-load terminal 11.

Specifically, in the embodiment of the present disclosure, the wireless communication system includes the BS 13 and a plurality of terminals. There is the low-load terminal 11 in the plurality of terminals. The wireless communication system is mainly intended to adjust transmission of a data stream at the low-load side of the low-load terminal 11. It adjusts the power consumption of the system by adjusting the width of the beam, thereby improving the overall energy efficiency of the system. The low-load terminal 11 is configured to transmit the electromagnetic wave to the BS 13 or receive the electromagnetic wave from the BS 13. The electromagnetic wave is an expression form of the data stream in transmission. The data stream is transmitted in the form of the electromagnetic wave. The phase shifters 12 are located in the BS 13, and configured to adjust the width of the beam. It is to be noted that there are a plurality of the phase shifters 12. Each of the phase shifters 12 is connected to one of BS antennas. A number of phase shifters 12 corresponding to a channel at a low-load side of each of the low-load terminals 11 may be the same, and may also be different.

According to the technical solutions in the embodiment of the present disclosure, the wireless communication system includes low-load terminals 11 each configured to transmit an electromagnetic wave to a BS 13 or receive an electromagnetic wave from the BS 13, a plurality of phase shifters 12 located in the BS 13, and configured to adjust a width of a beam, the beam being formed by the electromagnetic wave transmitted from the low-load terminal 11 to the BS 13 or the electromagnetic wave received from the BS 13, and a beamforming device based on phase shifter 12 switching control including a channel vector acquisition module, a contribution degree acquisition module, a phase shifter 12 switching-off module, and a width adjustment module. The channel vector acquisition module is configured to acquire a channel vector of a channel of the low-load terminal 11. The contribution degree acquisition module is configured to acquire, based on the channel vector, contribution degrees of phase shifters 12 corresponding to the channel. The phase shifter switching-off module is configured to sequentially change a connected state of each of the phase shifters 12 from closing to opening based on the contribution degrees of the phase shifters 12 corresponding to the channel, calculate a to-be-processed SINR of the low-load terminal 11 after changing the connected state of the phase shifter 12 once, stop to change the connected state of the phase shifter 12 if the to-be-processed SINR meets a preset condition, and change the connected state of the phase shifter 12 meeting the preset condition to the closing. The width adjustment module is configured to adjust, with at least one phase shifter 12 having the connected state in the closing, a width of a beam corresponding to the low-load terminal 11, the beam being formed by the electromagnetic wave transmitted from the BS 13 to the low-load terminal 11 or the electromagnetic wave received from the low-load terminal 11. Through the technical solutions in the embodiment of the present disclosure, the wireless communication system adjusts the phase shifters 12 at the low-load side of the low-load terminal 11, thereby adjusting the width of the beam, reducing the power consumption of the system, and improving the energy efficiency of the system.

Embodiment 5

An embodiment of the present disclosure further provides a storage medium including a computer executable instruction. The computer executable instruction is configured to implement the beamforming method based on phase shifter switching control when executed by a computer processor. The method includes:

Acquire a channel vector of a channel of each of low-load terminals 11, the channel being a channel at a low-load side of the low-load terminal 11; acquire, based on the channel vector, contribution degrees of phase shifters 12 corresponding to the channel, where there are a plurality of the phase shifters 12 corresponding to the channel, and the phase shifters 12 are located in a BS 13; sequentially change a connected state of each of the phase shifters 12 from closing to opening based on the contribution degrees of the phase shifters 12 corresponding to the channel, calculate a to-be-processed SINR of the low-load terminal 11 after changing the connected state of the phase shifter 12 once, stop to change the connected state of the phase shifter 12 if the to-be-processed SINR meets a preset condition, and change the connected state of the phase shifter 12 meeting the preset condition to the closing; and adjust, with at least one phase shifter 12 having the connected state in the closing, a width of a beam corresponding to the low-load terminal 11, the beam being formed by an electromagnetic wave transmitted from the BS 13 to the low-load terminal 11 or an electromagnetic wave received from the low-load terminal 11.

The computer storage medium in the embodiment of the present disclosure can use any combination of one or more computer readable media. The computer readable media each may be a computer readable signal medium or a computer readable storage medium. The computer readable storage medium, may be, for example, but not limited to, electrical, magnetic, optical, electromagnetic, infrared, or semiconductor systems, apparatuses, or devices, or any combination thereof. More specific examples (non-exhaustive) of the readable storage medium include an electrical connection with one or more conducting wires, a portable computer disk, a hard disk, a random access memory (RAM), a read-only memory (ROM), an erasable programmable ROM (an EPROM or a flash memory), an optical fiber, a portable CD-ROM, an optical storage device, a magnetic storage device, or any suitable combination thereof. In the present disclosure, the computer readable storage medium may be any tangible medium that contains or stores a program, and the program may be used by or in combination with an instruction execution system, apparatus, or device.

The computer readable signal medium may include a data signal propagated in a baseband or as a part of a carrier, and computer readable program code is carried therein. The propagated data signal may be in various forms, including but not limited to an electromagnetic signal, an optical signal, or any suitable combination thereof. The computer-readable signal medium may alternatively be any computer-readable medium except the computer-readable storage medium. The computer-readable medium may send, propagate or transmit a program used by or used in combination with an instruction execution system, apparatus or device.

The program code contained on the computer readable medium may be transmitted using any suitable medium, including but not limited to: wireless, wire, optical fiber, RF, or any suitable combination thereof.

The computer program code for executing the operations in the present disclosure may be compiled by using one or more program design languages or a combination thereof. The programming languages include object oriented programming languages, such as Java, Smalltalk, and C++, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. In a circumstance in which a remote computer is involved, the remote computer may be connected to a user computer over any type of network, including a local area network (LAN) or a wide area network (WAN), or may be connected to an external computer (for example, connected over the Internet by using an Internet service provider).

The above disclosed is only preferred examples of the present disclosure, and are not intended to limit the claimed scope of the present disclosure. Therefore, equivalent changes made according to the claims of the present disclosure are still within the scope of the present disclosure.

What is claimed is:

1. A beamforming method based on phase shifter switching control, comprising:
   acquiring a channel vector of a channel of each of low-load terminals, the channel being a channel at a low-load side of the low-load terminal;
   acquiring, based on the channel vector, contribution degrees of phase shifters corresponding to the channel, wherein there are a plurality of the phase shifters corresponding to the channel, and the phase shifters are located in a base station (BS);
   sequentially changing a connected state of each of the phase shifters from closing to opening based on the contribution degrees of the phase shifters corresponding to the channel, calculating a to-be-processed signal-to-interference-plus-noise ratio (SINR) of the low-load terminal after changing the connected state of the phase shifter once, stopping to change the connected state of the phase shifter if the to-be-processed SINR meets a preset condition, and changing the connected state of the phase shifter meeting the preset condition to the closing; and
   adjusting, with at least one phase shifter having the connected state in the closing, a width of a beam corresponding to the low-load terminal, the beam being formed by an electromagnetic wave transmitted from the BS to the low-load terminal or an electromagnetic wave received from the low-load terminal.

2. The beamforming method based on phase shifter switching control according to claim 1, before the acquiring a channel vector of a channel of each of low-load terminals, further comprising:
   determining, when detecting that to-be-transmitted data streams on an uplink channel and a downlink channel of a terminal are different in size, that the terminal is the low-load terminal, wherein the to-be-transmitted data streams each are transmitted in a form of the electromagnetic wave, and the electromagnetic wave forms the beam.

3. The beamforming method based on phase shifter switching control according to claim 1, after the acquiring a channel vector of a channel of each of low-load terminals, further comprising:
   acquiring an initial SINR of the low-load terminal based on the channel vector; and
   the stopping to change the connected state of the phase shifter if the to-be-processed SINR meets a preset condition comprises:
   stopping to change the connected state of the phase shifter if the to-be-processed SINR is less than preset times of the initial SINR.

4. The beamforming method based on phase shifter switching control according to claim 3, wherein there are a plurality of the low-load terminals; and
   the acquiring an initial SINR of the low-load terminal based on the channel vector comprises:
   inputting the channel vector of the low-load terminal to an initial SINR function to acquire the initial SINR of the low-load terminal, $$\mathrm{SINR}_k = \frac{P_t/K \left| h_k^H F_{RF} [F_{BB}]_{:,k} \right|^2}{\sigma^2 + P_t/K \left| h_k^H \sum_{u \ne k}^{K} F_{RF} [F_{BB}]_{:,u} \right|^2}$$

wherein, $\mathrm{SINR}_k$ represents an initial SINR of a kth low-load terminal, k represents a serial number of the low-load terminal, $h_k$ represents a channel vector of the kth low-load terminal, $P_t$ is a transmitted power of the BS in a system, $F_{RF}$ is a matrix of an analog beamformer, $F_{BB}$ is a matrix of a digital beamformer, $[F_{BB}]_{:,k}$ represents a kth column of elements of the digital beamformer, $[F_{BE}]_{:,u}$ represents a uth column of elements of the digital beamformer, $\sigma^2$ represents a noise power, K represents a number of the low-load terminals, each of the phase shifters is connected to one switch, and the analog beamformer comprises at least one phase shifter and a switch connected to the at least one phase shifter.

5. The beamforming method based on phase shifter switching control according to claim 4, wherein the acquiring, based on the channel vector, contribution degrees of phase shifters corresponding to the channel comprises:

inputting the channel vector of the low-load terminal to a contribution degree function to acquire a contribution degree of each of the phase shifters corresponding to the channel:

$$\delta(a_k) = \sum_{k=1}^{K} \frac{\gamma_k |[h_k]_{a_k}|^2}{\Sigma_{u=1}^{K}([h_u]_{a_k})^H [h_k]_{a_k}}$$

wherein, $\delta(a_k)$ represents a contribution degree of an $a_k$th phase shifter corresponding to a channel of the kth low-load terminal, $h_u$ represents a channel vector of a uth low-load terminal, $h_u$ falling within a range of [1, K], $h_k$ represents the channel vector of the kth low-load terminal, $[h_k]_{a_k}$ represents a channel element, corresponding to an $a_k$th BS antenna, in the channel vector of the kth low-load terminal, $[h_u]_{a_k}$ represents a channel element, corresponding to the $a_k$th BS antenna, in the channel vector of the uth low-load terminal, $\gamma_k$ represents the preset times, the BS comprises a plurality of BS antennas, and each of the phase shifters is connected to one of the BS antennas.

6. The beamforming method based on phase shifter switching control according to claim 5, wherein the calculating a to-be-processed SINR of the low-load terminal comprises:

calculating, for the low-load terminal, the channel vector of the low-load terminal, the connected state of the phase shifter, and a number of the BS antennas through a to-be-processed SINR function to acquire the to-be-processed SINR of the low-load terminal:

$$\tau_k(S_k) = \frac{P_t/K |h_{k,s}^H h_{k,s}|^2}{\sigma_n^2 + P_t/K \left| h_{k,s}^H \sum_{u \neq k}^{K} h_{u,s} \right|^2}$$

wherein, $\tau_k(S_k)$ represents a to-be-processed SINR of the kth low-load terminal, $h_{k,s}=h_k S_k$ represents an updated channel vector after a kth phase shifter is switched off, $S_k$ represents a selection matrix of the kth low-load terminal, a number of rows and a number of columns in the selection matrix depending on the number of the BS antennas, the selection matrix being a diagonal matrix and an element on a diagonal line being 0 or 1, 0 indicating that the connected state of the phase shifter is the opening, and 1 indicating that the connected state of the phase shifter is the closing, and $\sigma_n^2$ represents equivalent noise.

7. The beamforming method based on phase shifter switching control according to claim 1, wherein the sequentially changing a connected state of each of the phase shifters from closing to opening based on the contribution degrees of the phase shifters corresponding to the channel comprises:

sorting, for the phase shifters corresponding to the channel, the contribution degrees of the phase shifters in an ascending manner, and sequentially changing the connected state of each of the phase shifters from the closing to the opening.

8. A beamforming device based on phase shifter switching control, comprising:

a channel vector acquisition module configured to acquire a channel vector of a channel of each of low-load terminals, the channel being a channel at a low-load side of the low-load terminal;

a contribution degree acquisition module configured to acquire, based on the channel vector, contribution degrees of phase shifters corresponding to the channel, wherein there are a plurality of the phase shifters corresponding to the channel, and the phase shifters are located in a base station (BS);

a phase shifter switching-off module configured to sequentially change a connected state of each of the phase shifters from closing to opening based on the contribution degrees of the phase shifters corresponding to the channel, calculate a to-be-processed signal-to-interference-plus-noise ratio (SINR) of the low-load terminal after changing the connected state of the phase shifter once, stop to change the connected state of the phase shifter if the to-be-processed SINR meets a preset condition, and change the connected state of the phase shifter meeting the preset condition to the closing; and a width adjustment module configured to adjust, with at least one phase shifter having the connected state in the closing, a width of a beam corresponding to the low-load terminal, the beam being formed by an electromagnetic wave transmitted from the BS to the low-load terminal or an electromagnetic wave received from the low-load terminal.

9. A wireless communication system, comprising low-load terminals, a plurality of phase shifters, a base station (BS), and a beamforming device based on phase shifter switching control, wherein the low-load terminals each are configured to transmit an electromagnetic wave to the BS, or receive an electromagnetic wave from the BS;

the plurality of phase shifters are located in the BS, and configured to adjust a width of a beam, the beam being formed by the electromagnetic wave transmitted from the low-load terminal to the BS or the electromagnetic wave from the BS, and the beamforming device based on phase shifter switching control comprises a channel vector acquisition module, a contribution degree acquisition module, a phase shifter switching-off module, and a width adjustment module, wherein the channel vector acquisition module is configured to acquire a channel vector of a channel of the low-load terminal, the channel being a channel at a low-load side of the low-load terminal;

the contribution degree acquisition module configured to acquire, based on the channel vector, contribution degrees of phase shifters corresponding to the channel, wherein there are a plurality of the phase shifters corresponding to the channel;

the phase shifter switching-off module is configured to sequentially change a connected state of each of the phase shifters from closing to opening based on the contribution degrees of the phase shifters corresponding to the channel, calculate a to-be-processed signal-to-interference-plus-noise ratio (SINR) of the low-load terminal after changing the connected state of the phase shifter once, stop to change the connected state of the phase shifter if the to-be-processed SINR meets a preset condition, and change the connected state of the phase shifter meeting the preset condition to the closing; and the width adjustment module is configured to adjust, with at least one phase shifter having the connected state in the closing, the width of the beam corresponding to the low-load terminal, the beam being formed by the electromagnetic wave transmitted from the BS to the low-load terminal or the electromagnetic wave received from the low-load terminal.

\* \* \* \* \*